United States Patent Office 3,134,916
Patented May 26, 1964

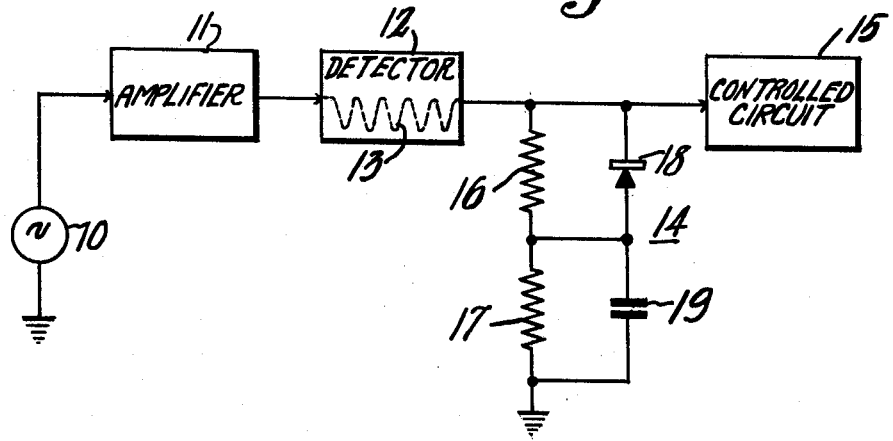
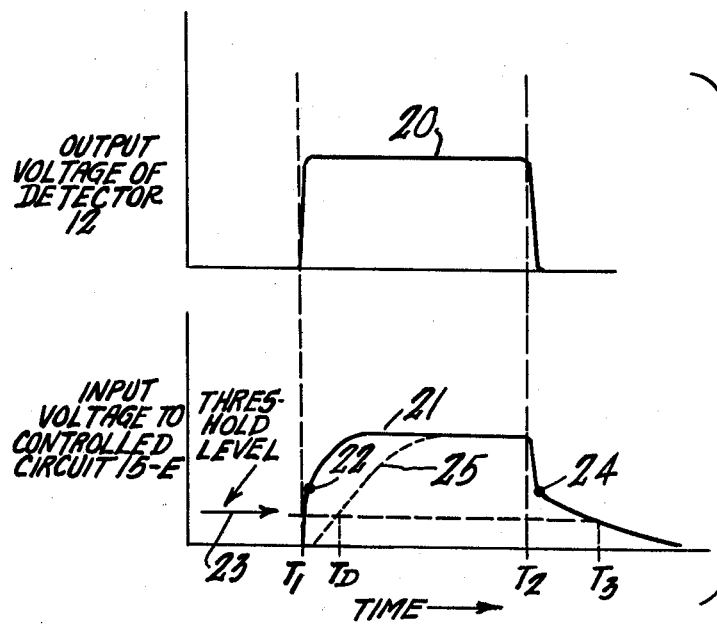

3,134,916
FAST-ATTACK CONTROL SYSTEM WITH CONTROLLED RELEASE TIME
Robert F. Sanford, Princeton Junction, N.J., assignor to Radio Corporation of America, a corporation of Delaware
Filed Dec. 27, 1960, Ser. No. 78,437
7 Claims. (Cl. 307—125)

This invention relates to control systems and, particularly, to an improved control system providing substantially instant actuation time of the controlled circuit with controlled release time.

Control systems presently used to effect the on-off operation of a controlled circuit customarily include a capacitive network for controlling the "off" or "release" time of the controlled circuit. Such networks serve to prevent an abrupt cut-off of the controlled circuit which might interrupt the continuity of the intelligence signal forwarded to the controlled circuit by the control system. Such networks are arranged to provide the desired minimum degree of distortion at the end of the intelligence signal.

Such a control system has the disadvantage that on start-up the capacitive network must charge up to the level of the intelligence signal applied to the controlled circuit. This necessarily means that a time delay occurs before the threshold level or turn-on level of the controlled circuit is reached. Any information included in the intelligence signal and occurring before the moment in time at which the threshold level is reached is either lost or distorted. In such arrangements as voice controlled systems, this action can result in a serious degradation of the intelligence signal.

It is, therefore, an object of the invention to provide an improved control system.

A further object is to provide an improved control system by which the turn-on time of the controlled circuit can be substantially instantaneous with the release time controlled by a capacitor discharge.

A still further object is to provide an improved fast-attack control system with controlled release time which is simple in operation and construction and requires a minimum number of components.

Briefly, the objects of the invention are accomplished by a control system circuit arrangement in which an electronic switch such as, for example, a diode is used to separate a capacitive network from the controlled circuit. The diode is connected so as to be back-biased or non-conductive upon an intelligence signal first being applied to the controlled circuit via the control system, preventing the charging of the capacitive network. As soon as the level of the intelligence signal exceeds the threshold or turn-on level of the controlled circuit, the controlled circuit becomes operative. Means, such for example as a resistive network shunting the diode, are provided to thereafter permit the capacitive network to charge toward the level of the intelligence signal and to remain charged at a desired level at least equal to the threshold level of the controlled circuit for the duration of the intelligence signal.

Upon the termination of the intelligence signal, the control system causes the level of the signal applied to the controlled circuit to closely follow that of the trailing edge of the intelligence signal until the level of the signal applied to the controlled circuit equals that of the charge on the capacitive network. Thereafter, the diode becomes forward-biased or conducting. The capacitive network then discharges and holds the level of the signal applied to the controlled circuit above the threshold level for a time duration determined by the time constants of the control system.

By the arrangement of the invention, the turn-on time of the controlled circuit is not delayed by charging a capacitor to the threshold level of the controlled circuit but rather is substantially instantaneous. However, the invention also permits the controlling of the turn-off or release time of the controlled circuit by a capacitor discharge or other means.

The invention will now be described in greater detail in connection with the accompanying drawing, in which:

FIGURE 1 is a circuit diagram of one embodiment of a control system constructed according to the invention; and FIGURE 2 displays curves useful in describing the operation of the embodiment shown in FIGURE 1.

A source 10 of an alternating current intelligence signal is shown in FIGURE 1. The source 10 may be a microphone, an oscillator or any other carrier generator. The output of the source 10 is fed through an amplifier 11 to a detector 12. The amplifier 11 is used mainly as an amplitude and impedance matching device for the detector 12 and source 10. The detector 12 may be any suitable diode combination coupled with a capacitive filter which provides a direct current out as some relation of the alternating current input. The detector 12 typically includes an internal resistance, indicated by the dotted line resistor 13.

A control system constructed according to the invention and indicated generally by the reference numeral 14 is coupled between the output of the detector 12 and a controlled circuit 15. The control system 14 includes a pair of resistance devices 16, 17 connected in series between the output of the detector 12 and a point of reference potential. A unidirectional current conducting device shown as a crystal diode 18 is coupled between the output of the detector 12 and the junction of resistance devices 16 and 17, the direction of the current flow through the diode 18 being indicated by the arrow. The diode 18 is poled according to the polarity of the output of detector 12. In the embodiment of FIGURE 1, it is assumed that the output of detector 12 is positive-going. The cathode of diode 18 is therefore coupled to the output of detector 12 with the anode of diode 18 being coupled to the junction of resistance devices 16, 17. A capacitor 19 is coupled between the point of reference potential and the junction of resistance devices 16, 17.

The controlled circuit 15 typically has a relatively high input impedance and may include a relay or any other device (not shown) in which a threshold is reached before some function is performed in or by the controlled circuit 15.

The operation of the embodiment shown in FIGURE 1 will be described with the assistance of the curves given in FIGURE 2. It will be assumed that it is desired to turn-on the controlled circuit 15 at some time $T_1$. The source 10 is operated to originate an intelligence signal. The intelligence signal is amplified in amplifier 11 and fed to detector 12. The detector 12 functions to produce an output direct current voltage E having a waveform represented by the curve 20 in FIGURE 2. If the intelligence signal is voice rather than a continuous tone, the curve 20 is meant to approximate the envelope of the intelligence signal.

At the time $T_1$, the anode of diode 18 is effectively at reference potential and is back-biased or non-conducting. Assuming that the rise time of the output voltage of detector 12 is substantially instantaneous, as the output voltage of detector 12, curve 20, rises, the input voltage E to controlled circuit 15 having a waveform as shown in curve 21 of FIGURE 2 initially rises toward point 22 of the curve 21 as a function of the relation $$E = \frac{R_{16}V}{R_{13}+R_{16}} \quad (1)$$

where V is the alternating current source peak voltage and the subscripts indicate the respective resistance values. Because the diode 18 is back-biased, the voltage E to the controlled circuit 15 sees no capacity, thus eliminating any charging delay.

The voltage E to controlled circuit 15 rises following the above relation along with the rise in the leading edge of the output voltage of detector 12 until the level of the voltage E exceeds the threshold level of the controlled circuit 15 at some point on the curve 21, for example, point 22. The threshold level of the controlled circuit 15 is indicated by the arrow 23 in FIGURE 2. The rise in the leading edge of the voltage curve 21 up to point 22 closely follows that of the voltage curve 20, resulting in the substantially instantaneous operation of the controlled circuit 15.

As time progresses beyond the point 22 on the curve 21, capacitor 19 charges up through resistance device 16 as a function of the voltage E following an exponential relation. The voltage E to controlled circuit 15 can reach a maximum value or end limit as shown by the following relation $$E = \frac{V(R_{16}+R_{17})}{R_{13}+R_{16}+R_{17}} \quad (2)$$

The voltage E to controlled circuit 15 remains above the threshold level 23 of the controlled circuit 15 for the duration of the intelligence signal originated by the source 10.

Upon the termination of the intelligence signal at time $T_2$, a trailing edge occurs in the curve 20 of the output voltage of detector 12. The voltage E to controlled circuit 15 will, as shown in curve 21, follow the trailing edge of curve 20 due to the voltage drop across resistance device 16 until the level of the voltage E equals the voltage charge on capacitor 19, for example, at point 24 on curve 21. Diode 18 then becomes forward-biased and conducting. The diode 18 by conducting holds the voltage E to the controlled circuit 15 at essentially the voltage of the capacitor 19, and the controlled circuit 15 is held "on." The capacitor 19 then discharges through resistor 17 at a predetermined rate which results in the eventual release of the controlled circuit 15 when the voltage E to controlled circuit 15 falls below the threshold level 23 at time $T_3$.

The above operation is to be contrasted with that which would occur without the arrangement of applicant's invention. In the latter case, the voltage E to the controlled circuit 15 would rise following time $T_1$ in the manner indicated by the dotted line curve 25 of FIGURE 2. A considerable time delay $T_D$ occurs before the voltage E to the controlled circuit 15 exceeds the threshold level 23. That portion of the intelligence signal occurring before the threshold level 23 is reached is lost or distorted, and the operation of the controlled circuit 15 is delayed a corresponding amount.

From the relations set forth above in Equations 1 and 2, it is seen that the value of the various components included in the control system 14 may be determined to provide a wide range of operating characteristics. The value of resistance device 16 is limited only by the requirement that, when taken with the internal impedance 13 of detector 12, the voltage at the junction of resistance device 16 and detector 12 exceeds the threshold level 23 of the controlled circuit 15 when the intelligence signal is first originated by source 10 and an output voltage from detector 12 appears.

The values of resistance devices 16, 17 and capacitor 19 may be related to provide any desired trailing edge or release characteristic of the voltage E to the controlled circuit 15. The amount of drop in the curve 21 to point 24 at which time the capacitor 19 begins to discharge can be set by properly determining the value of resistance device 16 and the value of capacitor 19. The discharge time of capacitor 19 thereafter can be determined by choosing the proper value of resistance device 17 for the selected capacitor 19. The particular values of the components needed to meet the requirements of a particular application may be determined using known techniques.

While it has been assumed that the output of detector 12 is positive-going, the output may be negative-going. In this case, the polarity of the diode 18 is reversed from that shown with the anode of diode 18 coupled to the output of detector 12. The operation of the control system otherwise will be identical to that described.

Also, while the invention has been described in connection with a source of alternating current intelligence signal, the invention is operable where the intelligence signal source is arranged to provide a direct current signal. The direct current signal source is simply coupled directly to the control system 14 at the junction of resistance device 16 and diode 18, eliminating the source 10, amplifier 11 and detector 12 shown in FIGURE 1. The impedance 13 then becomes the internal resistance of the connecting cable and/or input signal circuitry. The term V appearing in Equations 1 and 2 becomes the direct current source voltage.

In one application of the invention which has been constructed, an alternating current signal of two to three volts peak-to-peak was applied to a detector including a IN295 crystal diode properly poled and a .5 mfd. filter capacitor connected so as to smooth out variations in the envelope of the detected signal. The control system coupled to the output of the detector was constructed as shown in FIGURE 1 with the following values:

| | | |
|---|---|---|
| Resistance device 16 | ohms | 10,000 |
| Resistance device 17 | do | 15,000 |
| Capacitor 20 | mfd | 50 |
| Diode 18 | | IN295 |

The output of the control system was coupled to the winding of an electromagnetically controlled relay. The relay was found to trip instantaneously with the application of the signal to the control system and to release as a function of the values of the components in the control system.

One example of an application where the invention may be used is in voice-controlled single-sideband transmitters where a slow turn-on time will mean the loss of perhaps the first word or a part of that word. By using the arrangement of the invention, the transmitter is turned on substantially instantaneously and the release time can be set as desired for the application.

The controlled circuit 15 may be arranged to complete any one of a large number of functions. Instead of a simple turn-on and turn-off operation, the controlled circuit 15 may be responsive to the signal applied thereto to change plate voltages, monitor some condition in an equipment or perform any other function. The controlled circuit 15 alternatively may be any device in which a threshold may be reached or used as part of an automatic gain control circuit in a receiver.

What is claimed is:

1. A fast-attack control system with controlled release time comprising, in combination, connections for a controlled circuit arranged to be actuated in response to a predetermined signal voltage, means for applying said voltage to actuate said controlled circuit, a capacitive network for determining said controlled release time, means responsive only to said signal voltage for charging said network, from said signal voltage and switching means responsive to said signal voltage and to said network charging for effectively isolating said network from said controlled circuit during said actuation by said voltage and for selectively connecting said network to said circuit to provide said controlled release time.

2. A fast-attack control system with controlled release time comprising, in combination, a controlled circuit arranged to be actuated in response to signal voltage of at least a given level applied to an input thereof, a first and a second resistance device connected in series between said input and a point of reference potential, a unidirectional current conducting device coupled between said input and the junction of said resistance devices, a capacitor coupled between said junction and said point of reference potential, said unidirectional current conducting device being poled with respect to the polarity of said signal so as to remain non-conducting at the start of said signal and to become conducting only when the level of said signal falls below a given level of charge on said capacitor at least equal to said given signal level.

3. A fast-attack control system with controlled release time for use with a controlled circuit arranged to be turned on in response to and to remain on for the duration of a direct current signal voltage of at least a given level applied to an input of said circuit comprising, in combination, a first and a second resistance device connected in series between said input and a point of reference potential, a diode coupled between said input and the junction of said resistance devices, a capacitor coupled between said junction and said point of reference potential, said diode being poled with respect to the polarity of said signal so as to remain non-conducting at the start of said signal and to become conducting only when the level of said signal falls below a given level of charge on said capacitor at least equal to said given signal level.

4. A fast-attack control system with controlled release time for use with a controlled circuit arranged to be turned on in response to and to remain on for the duration of a positive going direct current signal voltage of at least a given level applied to an input of said circuit comprising, in combination, a first and a second resistance device connected in series between said input and a point of reference potential, a diode having an anode and a cathode, means to couple said cathode to said input and means to couple said anode to the junction of said resistance devices, a capacitor coupled between said junction and said point of reference potential, whereby said controlled circuit is turned on instantaneously with the start of said signal and is released a given time interval following the end of said signal according to the values of said capacitor and said resistance devices.

5. A fast-attack control system with controlled release time for use with a controlled circuit arranged to be turned on in response to and to remain on for the duration of a signal at least of a given level applied to an input of said circuit comprising, in combination, input means to which an alternating current signal voltage of at least said given level is applied, detecting means having a given internal impedance coupled to said input means for translating said alternating current signal voltage into a direct current signal voltage, means to apply said direct current voltage from said detecting means to said input of said controlled circuit, a first and a second resistance device connected in series between said input and a point of reference potential, a diode coupled between said input and the junction of said resistance devices, a capacitor coupled between said junction and said point of reference potential, said diode being poled with respect to the polarity of said direct current signal voltage to remain non-conducting at the start of said direct current signal voltage and to become conducting only when the level of said direct current signal voltage falls below a given level of charge on said capacitor at least equal to said given signal level.

6. A fast-attack control system with controlled release time comprising, in combination, connections for a controlled circuit arranged to be actuated in response to a control signal of at least a given level, means for applying said signal to said connections to actuate said controlled circuit, a capacitive network for determining said controlled release time, means for charging said network to a level at least equal to said given signal level, and switching means responsive to said signal and to said network charging for effectively isolating said network from said controlled circuit during said actuation by said signal and for connecting said network to said circuit to provide said controlled release time only when the level of said signal falls below the charge on said network at least equal to said given signal level.

7. A fast-attack control system with controlled release time comprising, in combination, connections for a controlled circuit arranged to be actuated in response to a control signal of at least a given level, means for applying said signal to said connections to actuate said controlled circuit, a capacitive network for determining said controlled release time, means responsive only to said signal for charging said network from said signal to a level at least equal to said given signal level, and a unidirectional current conducting device connected so as to be responsive to said signal and said network charging for effectively isolating said network from said controlled circuit during said actuation by said signal and for connecting said network to said circuit to provide said controlled release time only when the level of said signal falls below the charge on said network at least equal to said given signal level.

References Cited in the file of this patent
UNITED STATES PATENTS
2,962,606      Arnold _____ Nov. 29, 1960